A. L. NEWELL.
TRAP.
APPLICATION FILED MAY 20, 1910.

972,127.

Patented Oct. 4, 1910.

WITNESSES:
L. E. Noack.
J. B. Bowling.

INVENTOR
A. L. Newell,
BY
ATTORNEYS

UNITED STATES PATENT OFFICE.

ALONZO L. NEWELL, OF FROST, TEXAS.

TRAP.

972,127.  Specification of Letters Patent.  Patented Oct. 4, 1910.

Application filed May 20, 1910. Serial No. 562,356.

*To all whom it may concern:*

Be it known that I, ALONZO L. NEWELL, citizen of the United States, residing at Frost, in the county of Navarro and State of Texas, have invented certain new and useful Improvements in Traps, of which the following is a specification.

This invention has relation to traps.

The object of the invention is to provide a trap having an inclined tilting platform having its upper end at the bottom of a mirror disposed in the trapping chamber to entice the animal to walk up the platform, together with means whereby the door to the chamber is closed when the platform is depressed by the weight of the animal.

Another feature is the arrangement of the trapping mechanism, and a trapping chamber, an intermediate chamber and cage, all in a single frame, and such interior constructions as will both efficiently trap animals and prevent the escape of one while another is being trapped.

Finally the object of the invention is to provide means of the character described that will be strong, durable, efficient, and easy of operation, simple and comparatively inexpensive to construct, and also in which the several parts will not be likely to get out of working order.

Figure 1:
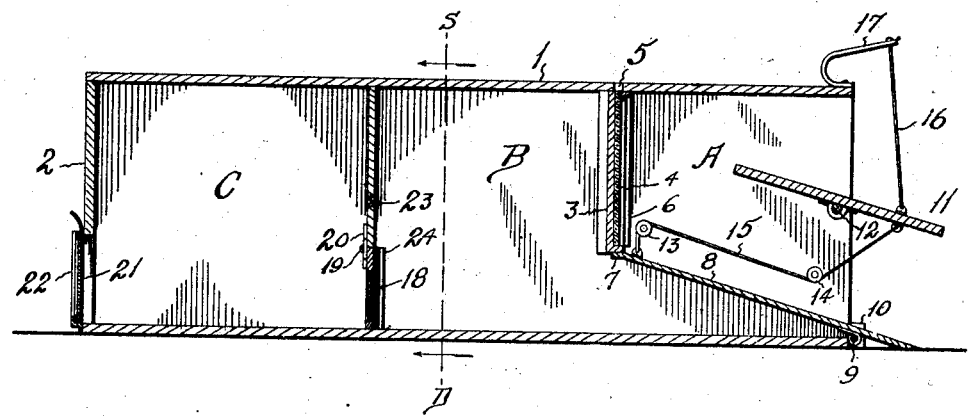
Figure 2:
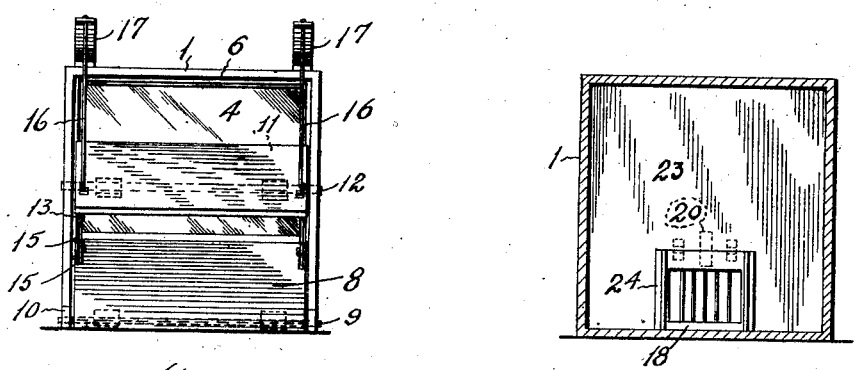
Figure 3:
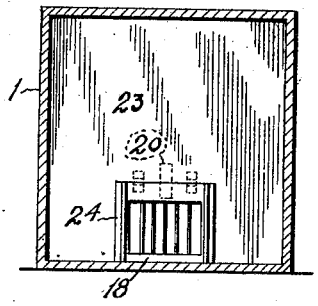
Figure 4:
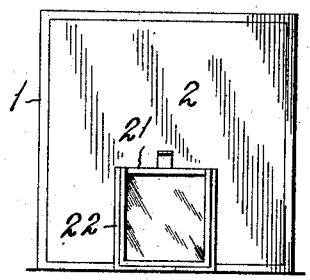

With the above and other objects in view, the invention has relation to certain novel features of construction and operation, an example of which is described in this specification and illustrated in the accompanying drawings, wherein:

Figure 1. is a longitudinal vertical sectional view of the trap in its "set" position, Fig. 2. is an elevation of the front end of the trap, Fig. 3. is a transverse vertical sectional view on the line S—D of Fig. 1, and Fig. 4. is an elevation of the rear end of the trap.

In the drawings, the numeral 1, designates an elongated frame having its front open, and its rear end closed by an end wall 2. The frame is divided into a trapping chamber A, an intermediate chamber B and cage or "prison" C. Between the chambers A and B, a frame 3 depends from the top of the frame 1, being secured to the side walls and terminating some distance above the bottom of the trap frame. This frame 3 supports transversely of the trapping chamber, a vertical mirror 4, which may be inserted or removed through a slot 5 in the top of the frame. Should the mirror be broken it may be easily replaced. The mirror is held in the frame by a guard 6 secured to the walls of the frame 1.

The underside of the frame 6 forms a stop for the lip 7 of a tilting platform 8, thus protecting the mirror and at the same time permitting the upper end of the platform and the mirror to stand in close relation. The platform inclines upward from a point in front of the trap, being pivoted on a transverse rod 9 supported in lugs 10 at side of the front of the trap. The forward end of the platform beginning on the ground line, provides a more enticing entrance for the animal than where he is required to jump or step up to reach the platform.

Transversely of the front end of the trap, a door 11 is pivoted on a transverse rod 12 mounted in the frame 1. It is desirable to have this door normally open and to close the same when the animal depresses the platform. For operating the door, pulleys 13 and 14 are mounted on each side of the trapping chamber, one mounted near the mirror and the other near the front end of the trapping frame. Flexible connections 15 extend from the inner upper end of the platform up over the pulleys 13 and forward and under the pulleys 14. From the pulleys 14, the connections pass up to the inner side of the door below its pivot point.

The door is normally in the position shown in Fig. 1 or inclined similar to the platform, the trap being open or "set." The door is held in this position by connections 16 extending from the outer side of the door to forwardly projecting spring members 17. These members are curved upward and have portions overhanging the front of the trap. When the platform is depressed, the connections 15 are drawn over the pulleys and swing the door downward to its closed position. The connections 16 pull the members 17 downward and owing to the resilient nature of the members, they will return the parts to their normal position when the animal steps from the platform into the chamber B.

After the animal steps from the platform 8, he enters the intermediate chamber B. This chamber is separated from the cage C by a vertical and transverse partition wall 23 having a door 18 fitting therein at the lower end and supported on hinges 19. This door is held closed by a spring 20 secured on the partition wall and bearing on the door on the cage side, its closing movement being limited by vertical guard strips 24 secured on the partition wall as shown in Figs. 1 and 3.

At the rear end of the cage a glass door or slide 21 is supported on the outside of the end wall 2 in the frame 22. This door 21 is used to admit light into the cage and also for the purpose of removing the animals therefrom. The door 18 is suitably constructed to permit light from the cage to enter the chamber B. This light will cause the animal to push open the door 18 and enter the cage C. It is also to be noted that the doors 18 and 21 being alined the animal while in the chamber B will be able to see through both doors and thus led to enter the cage.

By having the mirror 4 and the upper end of the platform 8 in close relation the animal is led to walk up the platform as he will see his own image in the mirror. The tension of the members 17 will not be overcome until the animal has advanced some distance up the platform, or that is until he has walked far enough up the platform past the pivot rod 9 for his weight to overcome the tension of the members and depress the platform sufficiently to close the door. When the said door 11 is closed by the depression of the platform, it will practically exclude light from the entrance and the animal will be attracted by the light from the door 18 and enter the chamber B.

What I claim is:

The combination in a trap, of a structure comprising a trapping chamber, an intermediate chamber and a cage, a partition between the cage and the intermediate chamber, a light admitting door hung in the partition, a vertical mirror arranged in the structure and terminating short of the bottom thereof, an upwardly inclined depressible platform having its upper end engaging below the mirror, the platform and the mirror separating the trapping chamber and the intermediate chamber, a normally open door pivoted in the entrance of the trapping chamber and over the platform, the platform having connection with the door for closing the same, and spring members mounted on the trapping chamber for returning the door to its normal position.

In testimony whereof I have signed my name to this specification in the presence of two subscribing witnesses.

ALONZO L. NEWELL.

Witnesses:
J. H. McCulloch,
T. C. Matthews.